United States Patent Office 2,735,269
Patented Feb. 21, 1956

2,735,269

SEALING POROUS FORMATIONS

Paul G. Carpenter, Bartlesville, Okla., assignor to Phillips Petroleum Company, a corporation of Delaware No Drawing. Application October 25, 1949,
Serial No. 123,540

20 Claims. (Cl. 61—36)

This invention relates to sealing of porous or permeable formations. In one of its aspects it relates to sealing of well formations. In another of its aspects the invention relates to sealing, plugging or partially plugging, of at least a part of a ground or earth formation so located that time is required to supply the sealing material to the precise location of the porous formation. In still another of its aspects the invention relates to a porous formation sealing method which is flexible and can be varied to adapt it to the sealing of formations located at various depths and composed of different substances, as will appear below. Other aspects and applications of the invention are apparent from this disclosure and its appended claims.

Methods for sealing porous formations have been proposed and are known in the art. These methods depend upon the use of more than one material and these must be contacted within the formations to be sealed. This involves rather hit or miss methods of injection, particularly when the formation is water-bearing and the materials injected are not aqueous in character so that these do not readily wet the formation.

This invention provides an entirely novel and highly advantageous method for sealing porous formations which constitutes an improvement in the art in that only one material is handled or manipulated and, therefore, all the required constituents or materials to lay down the sealing material are, per force, in contact at all parts of the formation.

According to the invention a water solution of a salt, of a water-insoluble acid, and a substance which upon gradual hydrolysis yields a free acid are injected into a porous formation before substantial hydrolysis of said substances can occur. In the formation, the hydrolysis occurs liberating the free acid which then reacts to form a water-insoluble free acid from said salt. The rate of liberation of the free acid by hydrolysis can be controlled by the addition of a buffer solution in an appropriate quantity to the solution being injected. Thus, because the buffer solution must first be used up before the pH becomes low enough to precipitate the free acid, the formation of the water-insoluble acid can be accelerated or controlled in respect of time depending upon the quantity of buffer solution used.

The water soluble salts of water-insoluble acids which are adaptable for use in the method of this invention are numerous and can, in each case, be selected by mere routine test. Likewise, the water-soluble substances which will hydrolyze at a rate suitable for this use in the method of the invention also can be determined by mere routine test. In cases of too slow hydrolysis the feature of the invention of control by adding a buffer solution is to be borne in mind. Thus, a too slowly hydrolyzing substance, by itself unsuitable, may be made suitable by using a suitable buffer solution. More specifically, among the water-soluble salts of water-insoluble acids which can be used are rosin soaps, including abietic acid, metal salts of acidic materials derived from rosin, alkali metal and ammonium salts of polyacrylic acid, alkali metal naphthenates, salts of carboxylic acids obtained by the oxidation of coal if the acids are insoluble at formation temperatures and the salts soluble at formation temperatures, salts of phthalic acid and salts of benzoic acid. As the hydrolyzing free acid liberating substance there can be used methyl formate, ethyl acetate, methyl acetate, methyl glycolate, trimethyl citrate, dimethyl tartrate and acid anhydrides such as phthalic anhydride.

As a feature of the invention, and as a modification thereof, a water solution of a salt of a water-insoluble acid, and an organic material, which will react with an oxidizing agent to yield an acid, and an oxidizing agent are injected into a porous formation. The rate of oxidation controls the rate of acid formation which in turn will control the rate at which the water-soluble salt of the water-insoluble acid will liberate said insoluble acid.

The water-soluble salts which have been mentioned above are also suitable for use in the modification of the invention just described. As the oxidizing agents there can be used potassium persulfate, sodium perchlorate, hydrogen peroxide, and sodium bromate. As the oxidizable organic material there can be used formaldehyde, acrolein, glyceraldehyde, crotonaldehyde, acetaldehyde, propionaldehyde, para-aldehyde, glucose and other reducing sugars, water soluble ethyl-, propyl-, methyl-, butyl-mercaptans, and certain reducible inorganic materials such as sodium thiosulfate.

The invention provides superior methods for the sealing of porous or permeable formations in the sense that homogeneous solutions or materials can be injected into the formations, there to lay down an insoluble sealing material. An important advantage of the invention is that the sealing materials can be removed, when desired, by dissolution using alkaline solutions.

From the foregoing it is also noted that the methods set forth use water solutions which will easily and readily wet water bearing formations.

Finally, the flexibility of the method is of great importance in its successful application to differently located formations. Thus, by the adjustment of the quantity of buffer used in the first embodiment of the invention, or by the proportioning of the oxidizing and of the oxidized compounds in the modification disclosed, any delay necessary to lay down properly a sealing material in a porous formation can be accomplished. Thus even solid materials can be employed provided these materials will be dissolved before entering the formation or in time to be useful for the intended purposes.

*Example I*

A ten per cent water solution of sodium salt of rosin, a commercial product called "Dresinate X" and sold by Hercules Powder Company, is mixed together with methyl formate in a quantity to insure hydrolysis to sufficient formic acid to cause formation of rosin. At the end of several hours, water insoluble rosin has been formed. The time lapse of this reaction can be controlled to allow for pumping the admixed materials into, say, an oil well or a water injection well.

*Example II*

Ten milliliters of a ten per cent water solution of sodium salt of rosin, five milliliters of a ten per cent water solution of glucose and five milliliters of a saturated solution of potassium persulfate were admixed and allowed to stand. Another admixture identically prepared was heated to 100° C. and allowed to cool. After three hours the first solution was clear. The second solution was then opaque and contained precipitated rosin. After two and one-half days both solutions were quite opaque, indicating that the formation of insoluble rosin could be delayed for a time sufficient to allow the admixture to be injected into a well or other place to seal a formation.

*Example III*

In the tabulation below are summarized seven tests conducted according to the invention showing the use of a buffer solution in varying quantities to vary the time taken to form the desired precipitate of sealing material. Each test solution was shaken and allowed to stand at room temperature (70°–75° F.).

| Test | 10% Na Resinate | Methyl Acetate | Standard Phosphate pH 10 buffer | Shaken at— | Precipitated Next Day | Hours for Precipitate to Form |
|---|---|---|---|---|---|---|
|  | ml. | ml. | ml. | p. m |  |  |
| B-1 | 20 | 0 | 0 | 2:30 | no precipitate |  |
| BE-2 | 20 | 5 | 0 | 2:31 | 11:30 a. m | 21 |
| B-3 | 20 | 5 | 1 | 2:32 | 12:30 p. m | 22 |
| B-4 | 20 | 5 | 2 | 2:33 | 10:00 a. m | 19½ |
| B-5 | 20 | 5 | 3 | 2:34 | 9:00 a. m | 18½ |
| B-6 | 20 | 5 | 4 | 2:35 | before 8:00 a. m | 17½ |
| B-7 | 20 | 5 | 5 | 2:36 | before 8:00 a. m | 17½ |

Buffers having an upper pH of about 8 or higher can be used according to the invention. Buffers of this kind are boric acid together with sodium hydroxide, sodium bicarbonate together with sodium carbonate, boric acid together with borax and borax alone.

Variation and modification are possible within the scope of the appended claims to the invention, the essence of which is that methods for sealing formations have been set forth comprising the use and ultimate admixture of an aqueous solution of a compound of a water-insoluble acid and a material which will slowly act to yield a free acid, which methods possess the inherent advantages set out and described herein constituting an improvement in the art. Equivalents within the scope of this disclosure and the appended claims can be readily determined by mere routine test and are intended to be included in said claims.

I claim:

1. The method of sealing a porous formation which comprises introducing into said formation an aqueous solution of a sodium rosin soap, formaldehyde and potassium persulfate.

2. A composition adapted to seal a porous formation containing as its essential operative ingredients an aqueous solution of a sodium rosin soap, formaldehyde and potassium persulfate.

3. A composition, useful for sealing porous formations, which composition consists essentially of an aqueous solution of a water-soluble salt of a water-insoluble organic acid, an aldehyde containing only carbon, hydrogen, and oxygen, and an inorganic oxidizing compound.

4. A composition according to claim 3 wherein said salt is a sodium salt of a rosin acid, said aldehyde is glucose, and said oxidizing agent is potassium persulfate.

5. A composition according to claim 3 wherein said salt is an alkali-metal salt of polyacrylic acid.

6. A composition according to claim 3 wherein said salt is a salt of phthalic acid.

7. A composition according to claim 3 wherein said salt is a salt of benzoic acid.

8. A composition according to claim 3 wherein said salt is an alkali-metal naphthenate.

9. A composition according to claim 3 wherein said aldehyde is acrolein.

10. A composition according to claim 3 wherein said aldehyde is glyceraldehyde.

11. A composition according to claim 3 wherein said aldehyde is acetaldehyde.

12. The method of sealing a porous formation which comprises introducing into said formation an aqueous solution of a water-soluble salt of a water-insoluble organic acid, an aldehyde containing only carbon, hydrogen and oxygen, and an inorganic oxidizing compound.

13. The method according to claim 12 wherein said salt is a sodium salt of a rosin acid, said aldehyde is glucose, and said oxidizing agent is potassium persulfate.

14. The method of claim 12 wherein said salt is an alkali-metal salt of polyacrylic acid.

15. A method according to claim 12 wherein said salt is a salt of phthalic acid.

16. A method according to claim 12 wherein said salt is a salt of benzoic acid.

17. A method according to claim 12 wherein said salt is an alkali-metal naphthenate.

18. A method according to claim 12 wherein said aldehyde is acrolein.

19. A method according to claim 12 wherein said aldehyde is glyceraldehyde.

20. A method according to claim 12 wherein said aldehyde is acetaldehyde.

References Cited in the file of this patent

UNITED STATES PATENTS

| | | |
|---|---|---|
| 115,484 | Keller | May 30, 1871 |
| 1,303,782 | Dugan | May 13, 1919 |
| 1,512,212 | De Cew | Oct. 21, 1924 |
| 2,090,626 | Grebe | Aug. 24, 1937 |
| 2,143,990 | Loomis | Jan. 17, 1939 |
| 2,176,266 | Malmberg | Oct. 17, 1939 |
| 2,201,459 | V. Hulst | May 21, 1940 |
| 2,208,766 | Lawton | July 23, 1940 |
| 2,281,810 | Stone | May 5, 1942 |
| 2,345,611 | Lerch | Apr. 4, 1944 |
| 2,362,973 | Cassaday | Nov. 21, 1944 |
| 2,378,235 | Miles | June 12, 1945 |
| 2,385,794 | Chappell | Oct. 2, 1945 |

FOREIGN PATENTS

| | | |
|---|---|---|
| 456,342 | Great Britain | Nov. 3, 1936 |